United States Patent
Lee et al.

(10) Patent No.: US 11,511,688 B2
(45) Date of Patent: Nov. 29, 2022

(54) SYSTEM AND METHOD FOR CONTROLLING HIGH-VOLTAGE RELAY OF VEHICLE

(71) Applicants: Hyundai Motor Company, Seoul (KR); Kia Motors Corporation, Seoul (KR)

(72) Inventors: Joong Woo Lee, Gyeonggi-do (KR); Jin Geun Bae, Daegu (KR); Man Jae Park, Gyeonggi-do (KR); Myung Won Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 362 days.

(21) Appl. No.: 16/588,149

(22) Filed: Sep. 30, 2019

(65) Prior Publication Data

US 2020/0346599 A1 Nov. 5, 2020

(30) Foreign Application Priority Data

May 3, 2019 (KR) ........................ 10-2019-0052484

(51) Int. Cl.
*B60R 16/033* (2006.01)
*H01H 47/22* (2006.01)
*H02J 7/00* (2006.01)

(52) U.S. Cl.
CPC ........... *B60R 16/033* (2013.01); *H01H 47/22* (2013.01); *H02J 7/0068* (2013.01)

(58) Field of Classification Search
USPC .................................................. 307/9.1, 10.1
See application file for complete search history.

(56) References Cited

U.S. PATENT DOCUMENTS

| | | | | |
|---|---|---|---|---|
| 5,410,238 A | * | 4/1995 | Ishizuka | H02J 7/0091 320/150 |
| 5,552,954 A | * | 9/1996 | Glehr | H01H 47/325 361/191 |
| 9,387,763 B2 | * | 7/2016 | Yoshimi | B60L 1/00 |
| 2012/0002341 A1 | * | 1/2012 | Lenz | H01H 47/22 361/160 |
| 2017/0080883 A1 | * | 3/2017 | Yasunori | H02J 7/007182 |
| 2018/0183353 A1 | * | 6/2018 | Baek | H02M 1/32 |
| 2019/0070970 A1 | * | 3/2019 | Chan | G05B 15/02 |
| 2020/0185936 A1 | * | 6/2020 | Oishi | B60L 58/19 |
| 2020/0384872 A1 | * | 12/2020 | Nakabayashi | G01R 31/36 |

FOREIGN PATENT DOCUMENTS

| | | | |
|---|---|---|---|
| JP | 2008147060 | * | 6/2008 |
| KR | 101210077 B1 | | 12/2012 |
| KR | 20160046481 | * | 4/2016 |

* cited by examiner

*Primary Examiner* — Toan T Vu
*Assistant Examiner* — Xuan Ly
(74) *Attorney, Agent, or Firm* — Fox Rothschild LLP

(57) ABSTRACT

A system for controlling a high-voltage relay of an eco-friendly vehicle includes a high-voltage battery, a plurality of driving devices driven with power supplied from the high-voltage battery, a relay unit including the high-voltage relay and a relay coil, the high-voltage relay being driven based on an amount of current flowing through the relay coil to interconnect the high-voltage battery and the driving devices, a load determiner for determining whether a conduction current load of the high-voltage relay is high or low, and a controller for changing the amount of current flowing through the relay coil based on a result of the determination of the load determiner.

15 Claims, 4 Drawing Sheets

SYSTEM AND METHOD FOR CONTROLLING HIGH-VOLTAGE RELAY OF VEHICLE

CROSS-REFERENCE TO RELATED APPLICATION

This application claims under 35 U.S.C. § 119(a) the benefit of Korean Patent Application No. 10-2019-0052484, filed on May 3, 2019 in the Korean Intellectual Property Office, the entire contents of which are incorporated herein by reference.

BACKGROUND

1. Technical Field

The present disclosure relates to a system and method for controlling a high-voltage relay of a vehicle, more particularly, to the system and method for controlling the high-voltage relay of an eco-friendly vehicle in which an amount of current flowing through a relay coil varies with a conduction current load of the high-voltage relay, thereby making it possible to improve durability of the high-voltage relay and minimize energy consumed to drive the high-voltage relay.

2. DESCRIPTION OF THE RELATED ART

In order to meet strengthened exhaust gas regulations on vehicles, development has been made for eco-friendly vehicles including pure electric vehicles, hybrid electric vehicles, and fuel cell vehicles.

Such an eco-friendly vehicle is equipped with a high-voltage battery, an auxiliary battery, a plurality of electric component loads, and a low-voltage direct current (DC) converter which converts a high voltage input from the high-voltage battery into a low voltage and supplies the converted low voltage to the auxiliary battery and the plurality of electric component loads. Here, the high-voltage battery acts to supply power for driving of the eco-friendly vehicle. This high-voltage battery is connected through a high-voltage relay with a plurality of vehicle driving systems which are driven with the power supplied from the high-voltage battery.

In particular, the high-voltage relay acts to connect or disconnect the high-voltage battery and the vehicle driving systems with or from each other. Here, the high-voltage relay may be driven by an exciting coil, which generates a magnetic force based on the flow of current, to interconnect the high-voltage battery and the plurality of vehicle driving systems.

On the other hand, the high-voltage relay should be essentially operated while the high-voltage battery is charged or discharged. In this regard, the exciting coil always exhausts driving force thereof with power supplied from a low-voltage battery (for example, a 12V battery), resulting in an increase in entire energy consumption.

SUMMARY

Therefore, the present disclosure provides a system and method for controlling a high-voltage relay of a vehicle (e.g., an eco-friendly vehicle) in which the amount of current applied to a relay coil varies with a conduction current load of the high-voltage relay, thereby making it possible to minimize energy consumed to drive the high-voltage relay.

In accordance with an aspect of the present disclosure, the above and other objects can be accomplished by the provision of a system for controlling a high-voltage relay of a vehicle (e.g., an eco-friendly vehicle), including a high-voltage battery, a plurality of driving devices driven with power supplied from the high-voltage battery, a relay unit including the high-voltage relay and a relay coil, the high-voltage relay being driven based on an amount of current flowing through the relay coil to interconnect the high-voltage battery and the driving devices, a load determiner for determining whether a conduction current load of the high-voltage relay is high or low, and a controller for changing the amount of current flowing through the relay coil based on a result of a determination of the load determiner.

The system may further include at least one of a charging device for supplying power to the high-voltage battery to charge the high-voltage battery, a charging type determiner for determining whether the high-voltage battery is slowly or quickly charged through the charging device, a running/stop determiner for determining whether the vehicle is in a running mode or a stop mode, or a low-voltage battery for supplying power to the relay coil.

The high-voltage relay may include an electromagnet at a lower end thereof, wherein the electromagnet, when the high-voltage relay is driven due to generation of a magnetic force in the relay coil based on the current flow through the relay coil, may be attached to a first contact of the high-voltage battery and a second contact of the driving devices to interconnect the high-voltage battery and the driving devices.

The load determiner may determine the conduction current load of the high-voltage relay to be low when the charging type determiner determines the high-voltage battery to be slowly charged.

The controller may apply current of an amount less than a predetermined amount to the relay coil when it is determined that the conduction current load of the high-voltage relay is low.

The load determiner may determine the conduction current load of the high-voltage relay to be low when the running/stop determiner determines the vehicle to be in the stop mode.

The controller may apply current of an amount less than a predetermined amount to the relay coil when it is determined that the conduction current load of the high-voltage relay is low.

The load determiner may determine the conduction current load of the high-voltage relay to be high when the charging type determiner determines the high-voltage battery to be quickly charged.

The controller may apply current of an amount greater than or equal to a predetermined amount to the relay coil when it is determined that the conduction current load of the high-voltage relay is high.

The load determiner may determine the conduction current load of the high-voltage relay to be high when the running/stop determiner determines the vehicle to be in the running mode.

The controller may apply current of an amount greater than or equal to a predetermined amount to the relay coil when it is determined that the conduction current load of the high-voltage relay is high.

The controller may apply current of an amount greater than or equal to a predetermined amount to the relay coil after the vehicle is started.

The amount of the current flowing through the relay coil may be calculated based on a voltage applied to the relay coil and a resistance of the relay coil.

In accordance with another aspect of the present disclosure, there is provided a method of controlling a high-voltage relay of an eco-friendly vehicle, including the steps of applying current of an amount greater than or equal to a predetermined amount to a relay coil after the vehicle is started, determining whether a conduction current load of the high-voltage relay is high or low, and changing the amount of current flowing through the relay coil based on a result of the conduction current load determination.

The step of determining whether a conduction current load of the high-voltage relay is high or low may include one or more of the steps of determining whether a high-voltage battery is slowly or quickly charged through a charging device, and determining whether the vehicle is in a running mode or a stop mode.

The step of determining whether a conduction current load of the high-voltage relay is high or low may further include the step of determining the conduction current load of the high-voltage relay to be low when it is determined that the high-voltage battery is slowly charged or the vehicle is in the stop mode.

The step of changing may include the step of applying current of an amount less than the predetermined amount to the relay coil when it is determined that the conduction current load of the high-voltage relay is low.

The step of determining whether a conduction current load of the high-voltage relay is high or low may further include the step of determining the conduction current load of the high-voltage relay to be high when it is determined that the high-voltage battery is quickly charged or the vehicle is in the running mode.

The step of changing may include the step of applying the current of the amount greater than or equal to the predetermined amount to the relay coil when it is determined that the conduction current load of the high-voltage relay is high.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Reference will now be made in detail to the preferred embodiments of the present disclosure, examples of which are illustrated in the accompanying drawings. Wherever possible, the same reference numbers will be used throughout the drawings to refer to the same or like parts.

Figure 1:
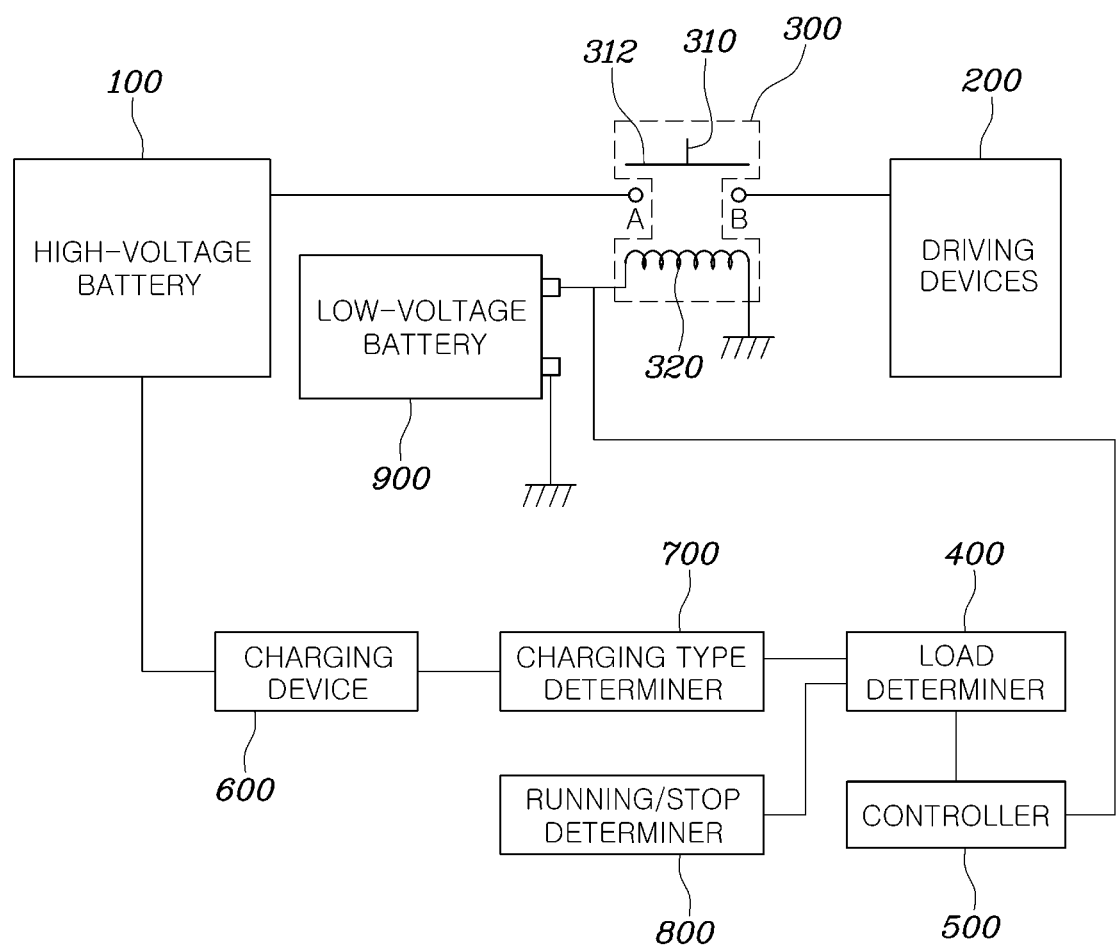
FIG. 1 is a block diagram showing the configuration of a system for controlling a high-voltage relay of an eco-friendly vehicle according to an embodiment of the present disclosure.
Figure 2:
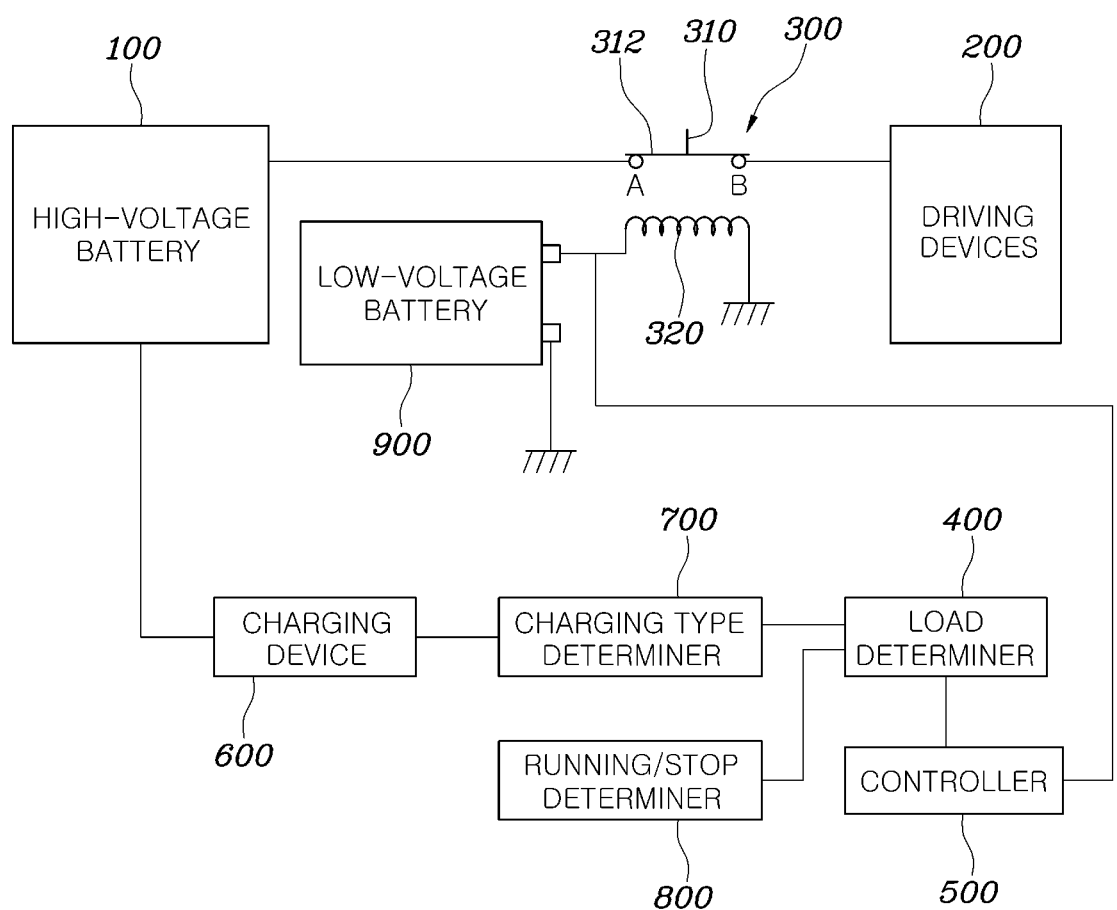
FIG. 2 is a block diagram illustrating connection between a high-voltage battery and driving devices by driving of the high-voltage relay based on an amount of current flowing through a relay coil in the high-voltage relay control system according to the embodiment of the present disclosure.
Figure 3:
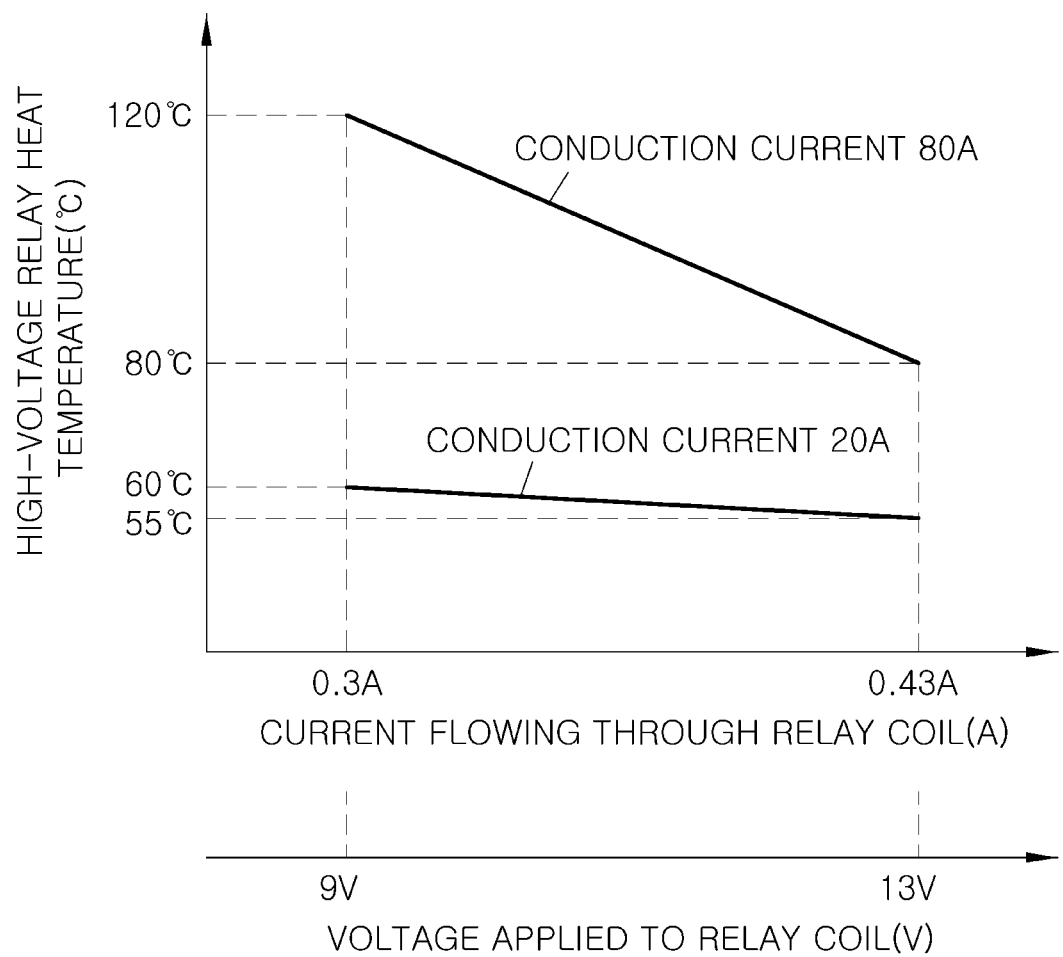
FIG. 3 is a data graph illustrating temperature variation of the high-voltage relay with load current flowing through the high-voltage relay and current and voltage of the relay coil in the high-voltage relay control system according to the embodiment of the present disclosure.

FIG. 1 shows the configuration of a system for controlling a high-voltage relay of an eco-friendly vehicle according to an embodiment of the present disclosure, FIG. 2 illustrates connection between a high-voltage battery and driving devices by driving of the high-voltage relay based on an amount of current flowing through a relay coil in the high-voltage relay control system according to the embodiment of the present disclosure, and FIG. 3 is a data graph illustrating temperature variation of the high-voltage relay with load current flowing through the high-voltage relay and current and voltage of the relay coil in the high-voltage relay control system according to the embodiment of the present disclosure.

As shown in FIG. 1, the high-voltage relay control system according to the embodiment of the present disclosure includes a high-voltage battery 100, a plurality of driving devices 200, a relay unit 300, a load determiner 400, and a controller 500. The high-voltage relay control system may further include at least one of a charging device 600, a charging type determiner 700, a running/stop determiner 800, or a low-voltage battery 900.

Here, the charging device 600 may supply power to the high-voltage battery 100 to charge the high-voltage battery 100. According to one embodiment, the charging device 600 may be electric vehicle supply equipment (EVSE). In addition, the charging device 600 may be a device capable of charging the high-voltage battery 100 slowly or quickly. The charging type determiner 700 acts to determine whether the high-voltage battery 100 is slowly or quickly charged through the charging device 600. According to one embodiment, the charging type determiner 700 may determine whether the charging device 600 is the slow charging device or the quick charging device, based on a charging signal (for example, a CP signal) transferred from the charging device 600. The running/stop determiner 800 may determine whether the vehicle is in a running mode or a stop mode. According to one embodiment, the running/stop determiner 800 may determine whether the vehicle is in the running mode or stop mode, based on wheel speed data detected from a wheel speed sensor. The low-voltage battery 900 acts to supply power to a relay coil 320 such that current flows through the relay coil 320. According to one embodiment, the low-voltage battery 900 may be a 12V battery.

The high-voltage battery 100 is a high-voltage battery which is equipped in the eco-friendly vehicle to supply power for driving of the eco-friendly vehicle. In particular, the high-voltage battery 100 may supply power for driving of a motor (not shown), and a low-voltage direct current converter (LDC) (not shown) may convert a high voltage from the high-voltage battery 100 into a low voltage and supply the converted low voltage to a variety of electric component loads, etc. equipped in the vehicle. In addition, the high-voltage battery 100 may be slowly or quickly charged with power supplied from the charging device 600 to be described later.

The plurality of driving devices 200 is driven with power supplied from the high-voltage battery 100. Here, the plurality of driving devices 200 may include a variety of driving devices equipped in the vehicle which are capable of being driven with the power supplied from the high-voltage battery 100. According to one embodiment, the driving devices 200 may include a motor, a low-voltage battery, and a variety of electric component loads equipped in the vehicle.

The relay unit 300 includes a high-voltage relay 310 having an electromagnet 312 at a lower end thereof, and a relay coil 320. As current flows through the relay coil 320, the high-voltage relay 310 may be driven to interconnect the high-voltage battery 100 and the driving devices 200. The connection between the high-voltage battery 100 and the driving devices 200 through the relay unit 300 will hereinafter be described with reference to FIG. 2. Referring to FIG. 2, when the low-voltage battery (for example, a 12V battery) 900 supplies power to the relay coil 320, current flows through the relay coil 320, thereby causing a magnetic force to be generated in the relay coil 320. As a result, the electromagnet 312 of the high-voltage relay 310 is driven to be attached to a first contact A of the high-voltage battery 100 and a second contact B of the driving devices 200, so as to interconnect the high-voltage battery 100 and the driving devices 200.

Here, that the high-voltage relay 310 is driven may mean that the electromagnet 312 of the high-voltage relay 310 moves toward the relay coil 320 due to generation of a magnetic force based on an amount of current flowing through the relay coil 320. In other words, as current flows through the relay coil 320 and a magnetic force is thus generated in the relay coil 320, the electromagnet 312 of the high-voltage relay 310 may move toward the relay coil 320 so as to be attached to a first contact A of the high-voltage battery 100 and a second contact B of the driving devices 200, thereby interconnecting the high-voltage battery 100 and the driving devices 200.

The load determiner 400 acts to determine whether a conduction current load of the high-voltage relay 310 is high or low. In particular, when the charging type determiner 700 determines the high-voltage battery 100 to be slowly charged, the load determiner 400 may determine that the conduction current load of the high-voltage relay 310 is low. In addition, when the running/stop determiner 800 determines the vehicle to be in the stop mode, the load determiner 400 may determine that the conduction current load of the high-voltage relay 310 is low.

On the other hand, when the charging type determiner 700 determines the high-voltage battery 100 to be quickly charged, the load determiner 400 may determine that the conduction current load of the high-voltage relay 310 is high. In addition, when the running/stop determiner 800 determines the vehicle to be in the running mode, the load determiner 400 may determine that the conduction current load of the high-voltage relay 310 is high.

The controller 500 may change the amount of current flowing through the relay coil 320 based on a result of the determination of the load determiner 400. Here, the amount of current flowing through the relay coil 320 may be calculated based on a voltage applied to the relay coil 320 and a resistance of the relay coil 320. In other words, because the resistance of the relay coil 320 is preset, the amount of current flowing through the relay coil 320 may be changed by changing the voltage applied to the relay coil 320.

In particular, when the load determiner 400 determines the conduction current load of the high-voltage relay 310 to be low, the controller 500 may perform a control operation such that current of an amount less than a predetermined amount is applied to the relay coil 320. Alternatively, when the load determiner 400 determines the conduction current load of the high-voltage relay 310 to be high, the controller 500 may perform a control operation such that current of an amount greater than or equal to the predetermined amount is applied to the relay coil 320. With reference to FIGS. 2 and 3, a description will hereinafter be given of an operation of the controller 500 changing the amount of current flowing through the relay coil 320 based on a result of the load determination of the load determiner 400, thereby improving durability of the high-voltage relay 310 and minimizing energy consumed to drive the high-voltage relay 310.

Referring to FIG. 2, as the amount of current flowing through the relay coil 320 increases, the strength of a magnetic force generated in the relay coil 320 becomes larger, resulting in an increase in contact force of the first contact A of the high-voltage battery 100 and the second contact B of the driving devices 200 by the electromagnet 312 of the high-voltage relay 310. As a result, the high-voltage relay 310 is reduced in conduction resistance and, in turn, in conduction heat, so that it may be improved in durability.

Referring to FIG. 3, it can be seen that the heat generation of the high-voltage relay 310 is limited according to the amount of current flowing through the relay coil 320 when the conduction current load of the high-voltage relay 310 is low. In other words, when the conduction current load of the high-voltage relay 310 is low, for example, when the high-voltage battery 100 is slowly charged or the vehicle is in the stop mode, the controller 500 may apply current of an amount less than the predetermined amount to the relay coil 320, so as to minimize energy consumed to drive the high-voltage relay 310.

Referring to FIG. 3, assuming that the rated current of the high-voltage relay 310 is the 80 A class, the resistance of the relay coil 320 is 30Ω and the slow charging time is 4 hours, the load determiner 400 determines the conduction current load of the high-voltage relay 310 to be low and the controller 500 thus changes the amount of current applied to the relay coil 320 (0.4 A→0.3 A). The resulting energy consumption of the present disclosure and the energy consumption of the related art in which the amount of current applied to the relay coil 320 suffers no change can be compared as follows.

Conventional energy consumption=12 $V$×0.4 $A$×4 hours×3600 sec=69,120 $J$

Present energy consumption=9 $v$×0.3 $A$×4 hours× 3600 sec=38,880 $J$

Namely, according to the present disclosure, energy consumed to drive the high-voltage relay 310 may be minimized by changing the amount of current flowing through the relay coil 320 according to the determination result of the load determiner 400.

On the other hand, the controller 500 may apply current of an amount greater than or equal to the predetermined amount to the relay coil 320 after the vehicle is started.

Figure 4:
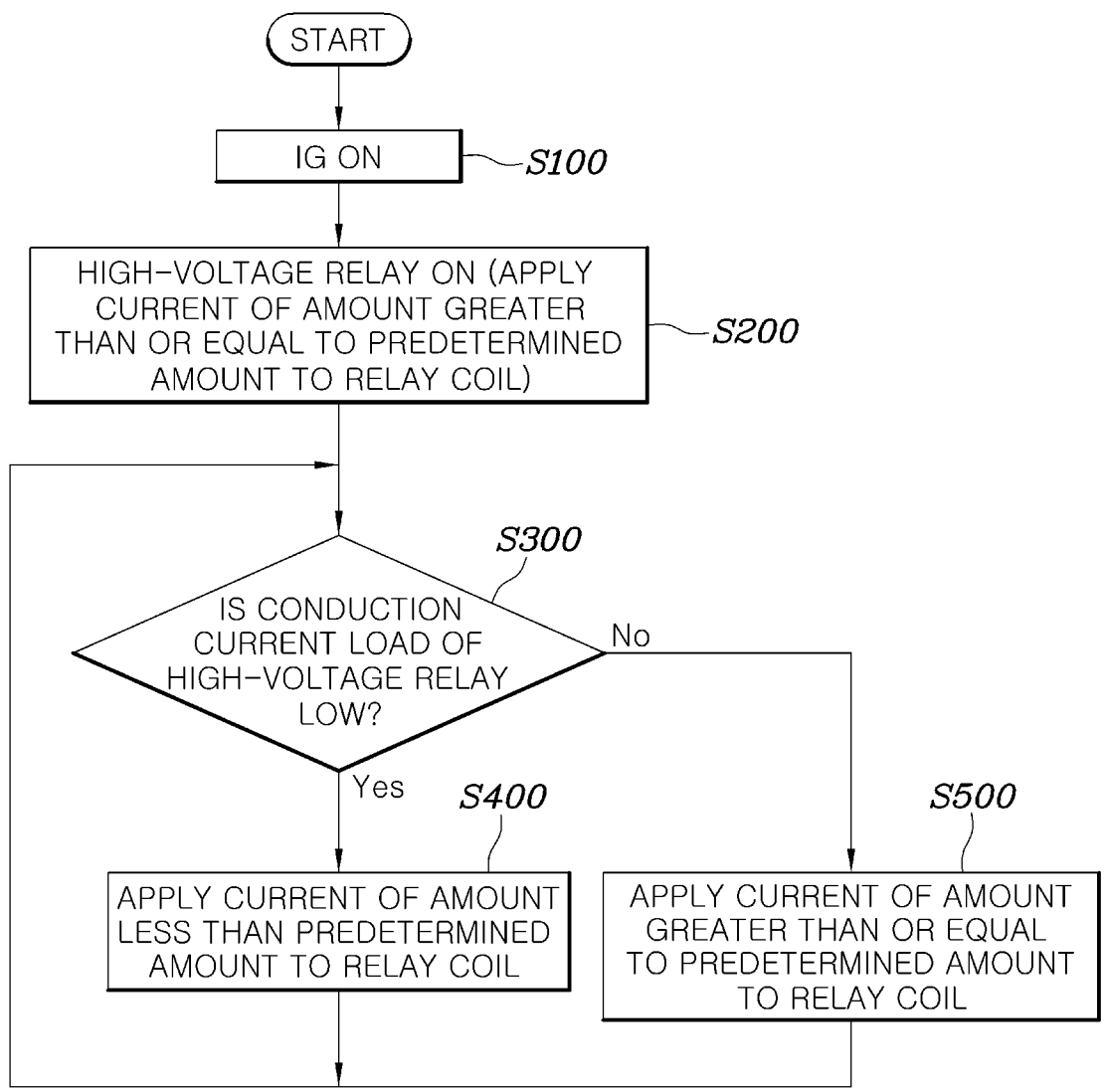
FIG. 4 is a flowchart illustrating a method of controlling a high-voltage relay of an eco-friendly vehicle according to an embodiment of the present disclosure.

FIG. 4 is a flowchart illustrating a method of controlling a high-voltage relay of an eco-friendly vehicle according to an embodiment of the present disclosure. As shown in FIG. 4, the high-voltage relay control method according to the present embodiment may include the steps of applying current of an amount greater than or equal to a predetermined amount to a relay coil after the vehicle is started, determining whether a conduction current load of the high-voltage relay is high or low, and changing the amount of current flowing through the relay coil based on a result of the conduction current load determination.

In particular, the step of determining whether a conduction current load of the high-voltage relay is high or low may include one or more of the steps of determining whether a high-voltage battery is slowly or quickly charged through a charging device, and determining whether the vehicle is in a running mode or a stop mode.

The step of determining whether a conduction current load of the high-voltage relay is high or low may further include the step of determining the conduction current load of the high-voltage relay to be low when it is determined that the high-voltage battery is slowly charged or the vehicle is in the stop mode.

In addition, the step of changing may include the step of applying current of an amount less than the predetermined amount to the relay coil when it is determined that the conduction current load of the high-voltage relay is low.

Alternatively, the step of determining whether a conduction current load of the high-voltage relay is high or low may further include the step of determining the conduction current load of the high-voltage relay to be high when it is determined that the high-voltage battery is quickly charged or the vehicle is in the running mode.

In addition, the step of changing may include the step of applying the current of the amount greater than or equal to the predetermined amount to the relay coil when it is determined that the conduction current load of the high-voltage relay is high.

Details of the respective steps of the high-voltage relay control method are the same as those of the above-described high-voltage relay control system, and a detailed description thereof will thus be omitted.

As is apparent from the above description, according to the present disclosure, the amount of current flowing through a relay coil varies with a conduction current load of a high-voltage relay, thereby making it possible to improve durability of the high-voltage relay and minimize energy consumed to drive the high-voltage relay.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A system for controlling a high-voltage relay of a vehicle, comprising:
    a high-voltage battery;
    a plurality of driving devices driven with power supplied from the high-voltage battery;
    a relay unit comprising the high-voltage relay and a relay coil, the high-voltage relay being driven based on an amount of current flowing through the relay coil to interconnect the high-voltage battery and the driving devices;
    a load determiner for determining whether a conduction current load of the high-voltage relay is high or low, wherein the load determiner determines the conduction current load of the high-voltage relay to be low when the charging type determiner determines the high-voltage battery to be slowly charged based on a charging signal transferred from the charging device;
    a controller for changing the amount of current flowing through the relay coil based on a result of a determination of the load determiner, wherein the controller applies current of an amount less than a predetermined amount to the relay coil when it is determined that the conduction current load of the high-voltage relay is low; and
    a charging type determiner for determining whether the high-voltage battery is slowly or quickly charged through the charging device.

2. The system according to claim 1, further comprising at least one of:
    a charging device for supplying power to the high-voltage battery to charge the high-voltage battery;
    a running/stop determiner for determining whether the vehicle is in a running mode or a stop mode; or
    a low-voltage battery for supplying power to the relay coil.

3. The system according to claim 1, wherein the high-voltage relay comprises an electromagnet at a lower end thereof,
    wherein the electromagnet, when the high-voltage relay is driven due to generation of a magnetic force in the relay coil based on the current flow through the relay coil, is attached to a first contact of the high-voltage battery and a second contact of the driving devices to interconnect the high-voltage battery and the driving devices.

4. The system according to claim 2, wherein the load determiner determines the conduction current load of the high-voltage relay to be low when the running/stop determiner determines the vehicle to be in the stop mode.

5. The system according to claim 4, wherein the controller applies current of an amount less than a predetermined amount to the relay coil when it is determined that the conduction current load of the high-voltage relay is low.

6. The system according to claim 2, wherein the load determiner determines the conduction current load of the high-voltage relay to be high when the charging type determiner determines the high-voltage battery to be quickly charged based on a charging signal transferred from the charging device.

7. The system according to claim 6, wherein the controller applies current of an amount greater than or equal to a predetermined amount to the relay coil when it is determined that the conduction current load of the high-voltage relay is high.

8. The system according to claim 2, wherein the load determiner determines the conduction current load of the high-voltage relay to be high when the running/stop determiner determines the vehicle to be in the running mode.

9. The system according to claim 8, wherein the controller applies current of an amount greater than or equal to a predetermined amount to the relay coil when it is determined that the conduction current load of the high-voltage relay is high.

10. The system according to claim 1, wherein the controller applies current of an amount greater than or equal to a predetermined amount to the relay coil after the vehicle is started.

11. The system according to claim 1, wherein the amount of the current flowing through the relay coil is calculated based on a voltage applied to the relay coil and a resistance of the relay coil.

12. A method of controlling a high-voltage relay of a vehicle, comprising the steps of:
   a) applying, by a controller, current of an amount greater than or equal to a predetermined amount to a relay coil after the vehicle is started;
   b) determining, by a load determiner, whether a conduction current load of the high-voltage relay is high or low, wherein the determining comprises i) determining whether a high-voltage battery is slowly or quickly charged through a charging device and ii) determining the conduction current load of the high-voltage relay to be low when it is determined that the high-voltage battery is slowly charged based on a charging signal transferred from the charging device, or the vehicle is in the stop mode based on wheel speed data detected by a wheel speed sensor; and
   c) changing, by the controller, the amount of current flowing through the relay coil based on a result of a conduction current load determination, wherein the charging comprises applying current of an amount less than the predetermined amount to the relay coil when it is determined that the conduction current load of the high-voltage relay is low.

13. The method according to claim 12, wherein the step of determining whether the conduction current load of the high-voltage relay is high or low further comprises:
   determining whether the vehicle is in a running mode or a stop mode.

14. The method according to claim 12, wherein the step of determining whether a conduction current load of the high-voltage relay is high or low further comprises the step of determining the conduction current load of the high-voltage relay to be high when it is determined that the high-voltage battery is quickly charged based on a charging signal transferred from the charging device, or the vehicle is in the running mode based on wheel speed data detected by a wheel speed sensor.

15. The method according to claim 14, wherein the step of changing the amount of current flowing through the relay coil based on the result of the conduction current load determination further comprises the step of applying the current of the amount greater than or equal to the predetermined amount to the relay coil when it is determined that the conduction current load of the high-voltage relay is high.

* * * * *